United States Patent
Zhu et al.

(10) Patent No.: US 12,417,568 B2
(45) Date of Patent: Sep. 16, 2025

(54) UNREAL ENGINE GRAPHIC CONSTRUCTION METHOD AND APPARATUS, COMPUTER-READABLE STORAGE MEDIUM

(71) Applicant: BOE Technology Group Co., Ltd., Beijing (CN)

(72) Inventors: Danfeng Zhu, Beijing (CN); Zhe Zhang, Beijing (CN); Xiao Chu, Beijing (CN); Naichuan Chen, Beijing (CN); Sujia Jiang, Beijing (CN); Hongxiang Shen, Beijing (CN); Ming Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/284,552

(22) PCT Filed: Dec. 21, 2022

(86) PCT No.: PCT/CN2022/140823
§ 371 (c)(1),
(2) Date: Sep. 28, 2023

(87) PCT Pub. No.: WO2024/130607
PCT Pub. Date: Jun. 27, 2024

(65) Prior Publication Data
US 2025/0086857 A1     Mar. 13, 2025

(51) Int. Cl.
*G06T 11/20* (2006.01)
*G06T 11/00* (2006.01)

(52) U.S. Cl.
CPC .......... *G06T 11/206* (2013.01); *G06T 11/001* (2013.01)

(58) Field of Classification Search
CPC ............................ G06T 11/206; G06T 11/001
See application file for complete search history.

(56) References Cited

U.S. PATENT DOCUMENTS

| | | | |
|---|---|---|---|
| 11,935,195 B1 * | 3/2024 | Futryk | A63F 13/65 |
| 2007/0070071 A1 | 3/2007 | Terazono et al. | |
| 2022/0331953 A1 * | 10/2022 | Huang | B25J 9/1679 |
| 2023/0214191 A1 * | 7/2023 | Won | G06F 8/30 |
| | | | 717/101 |
| 2024/0037692 A1 * | 2/2024 | Stoye | G06T 11/001 |

FOREIGN PATENT DOCUMENTS

| | | |
|---|---|---|
| CN | 107767429 A | 3/2018 |
| CN | 110570045 A | 12/2019 |
| CN | 115409957 A | 11/2022 |
| CN | 115409960 A | 11/2022 |

OTHER PUBLICATIONS

Nop et al.; Development of Character Design Frameworks using Game Engine: Unreal Engine; Apr. 2019; IEEE Explore (Year: 2019).*

* cited by examiner

*Primary Examiner* — David T Welch
(74) *Attorney, Agent, or Firm* — Ling Wu; Stephen Yang; Ling and Yang Intellectual Property

(57) ABSTRACT

An unreal engine graphic construction method includes the following steps: receiving data to be displayed; determining a number N of basic graphics contained in a graphic to be constructed according to the data to be displayed, wherein, N>1; calling an underlying function at a blueprint layer to draw N of the basic graphics in sequence, wherein the underlying function is used for creating the basic graphics.

10 Claims, 10 Drawing Sheets

UNREAL ENGINE GRAPHIC CONSTRUCTION METHOD AND APPARATUS, COMPUTER-READABLE STORAGE MEDIUM

CROSS-REFERENCE TO RELATED APPLICATION

This application is a national stage application of PCT Application No. PCT/CN2022/140823, which is filed on Dec. 21, 2022 and entitled "Unreal Engine Graphic Construction Method and Apparatus, Computer-Readable Storage Medium", the content of which should be regarded as being incorporated herein by reference.

TECHNICAL FIELD

Embodiments of the disclosure relate to but not limited to the unreal engine technical field, in particular to an unreal engine graphic construction method and apparatus, and a computer-readable storage medium.

BACKGROUND

Digital twin is a simulation process making full use of physical model, sensor update, operation history and other data, integrating multi-disciplinary, multi-physical quantity, multi-scale and multi-probability, which completes mapping in virtual space, thus reflecting the whole life cycle process of corresponding physical equipment. At present, at the data visualization level of digital twin, the implementation schemes of chart technology are divided into the following two types:
1) using Echarts component to visualize chart data for exhibition, wherein the advantage of this manner is that it is open source and can meet most of the panel layer data visualization requirements. However, in the field of digital twin, in addition to the panel-level data visualization, there are also many chart behaviors that need to be cooperated with animation, special effects and shots. However, due to the dependence of Echarts components on Web browsers, this method cannot meet the requirements of such chart behaviors.
2) processing corresponding chart materials and grid bodies by art developers to meet the exhibition of a series of chart contents, wherein, although this manner can meet certain data chart exhibition capabilities, it is time-consuming and labor-intensive, and the developed products, such as grid bodies, cannot be reused and iterated in different scenes, projects or business.

SUMMARY

The following is a summary of subject matter described herein in detail. The summary is not intended to limit the protection scope of claims.

An embodiment of the present disclosure provides an unreal engine graphic construction method, including:
  receiving data to be displayed;
  determining a number N of basic graphics contained in a graphic to be constructed according to the data to be displayed, where N>1;
  calling an underlying function at a blueprint layer and drawing N of the basic graphics in sequence, wherein the underlying function is used for creating the basic graphics.

An embodiment of the present disclosure further provides an unreal engine graphic construction apparatus, including a memory and a processor connected to the memory, the memory is configured to store instructions, the processor is configured to perform steps of the unreal engine graphic construction method according to any embodiment of the present disclosure based on the instructions stored in the memory.

An embodiment of the present disclosure also provides a computer-readable storage medium on which a computer program is stored, and when the program is executed by the processor, the unreal engine graphic construction method according to any embodiment of the present disclosure is realized.

Other aspects may be comprehended upon reading and understanding of the drawings and detailed description.

BRIEF DESCRIPTION OF DRAWINGS

The accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

To make objectives, technical solutions, and advantages of the present disclosure clearer, the embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. "Include", "contain", or a similar term means that an element or article appearing before the term covers an element or article and equivalent thereof listed after the term, and other elements or articles are not excluded.

Low Code is a development method for visualization application, which delivers applications with less code and faster speed, and automates the code that programmers don't want to develop, which is called Low Code. Low code is a set of digital technology tools, which is based on more efficient manners such as graphical drag and drop, parametric configuration, and the like to realize rapid construction, data arrangement, connection ecology, and middle office business. Scene application innovation in digital transformation with a small amount of code or no code is realized.

Figure 1:
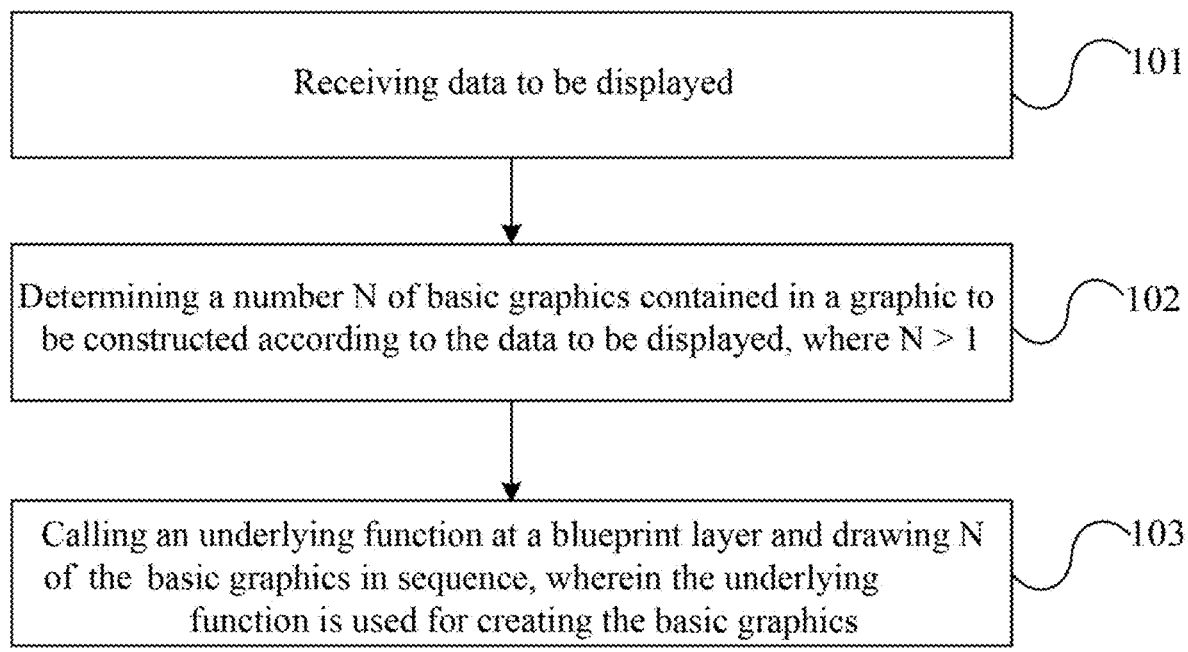
FIG. 1 is a flow diagram of an unreal engine graphic construction method according to an exemplary embodiment of the present disclosure.

As shown in FIG. 1, an embodiment of the present disclosure provides an unreal engine graphic construction method, including:

Step 101: receiving data to be displayed;
Step 102: determining a number N of basic graphics contained in the graphic to be constructed according to the data to be displayed, where N>1;
Step 103: calling an underlying function at a blueprint layer and drawing N of the basic graphics in sequence, wherein the underlying function is used for creating the basic graphics.

In the unreal engine graphic construction method according to an embodiment of the disclosure, an underlying function of the unreal engine (C++ development language) is used as the underlying driving mode, the underlying function is called at the BluePrint layer (C++ is used as the bottom layer and correspondingly has extremely strong cross-platform compatibility capability), and low code is used to expose the corresponding data model interface. Therefore, while meeting the data visualization requirement capability, it can also cooperate with the unreal engine itself to complete the cooperation of the corresponding animations, special effects and/or the cameras to complete the display capability of the three-dimensional graphic with higher performance and better compatibility, thus solving the problem that the Echarts system relies on the Web browser and cannot display the three-dimensional graphic with the cooperation of the camera movement, animations and special effects.

In addition, the unreal engine graphic construction method according to an embodiment of the present disclosure uses the data model to complete the whole low-code development process, only needs the data model to drive, is completely iterative and reusable, can be compatible with the use of two roles of program developers and art developers, meets the requirements of improving development efficiency and realizing data visualization, greatly reduces the development cycle of three-dimensional graphic in the unreal engine, and can greatly reduce the development time of developers.

Figure 2:
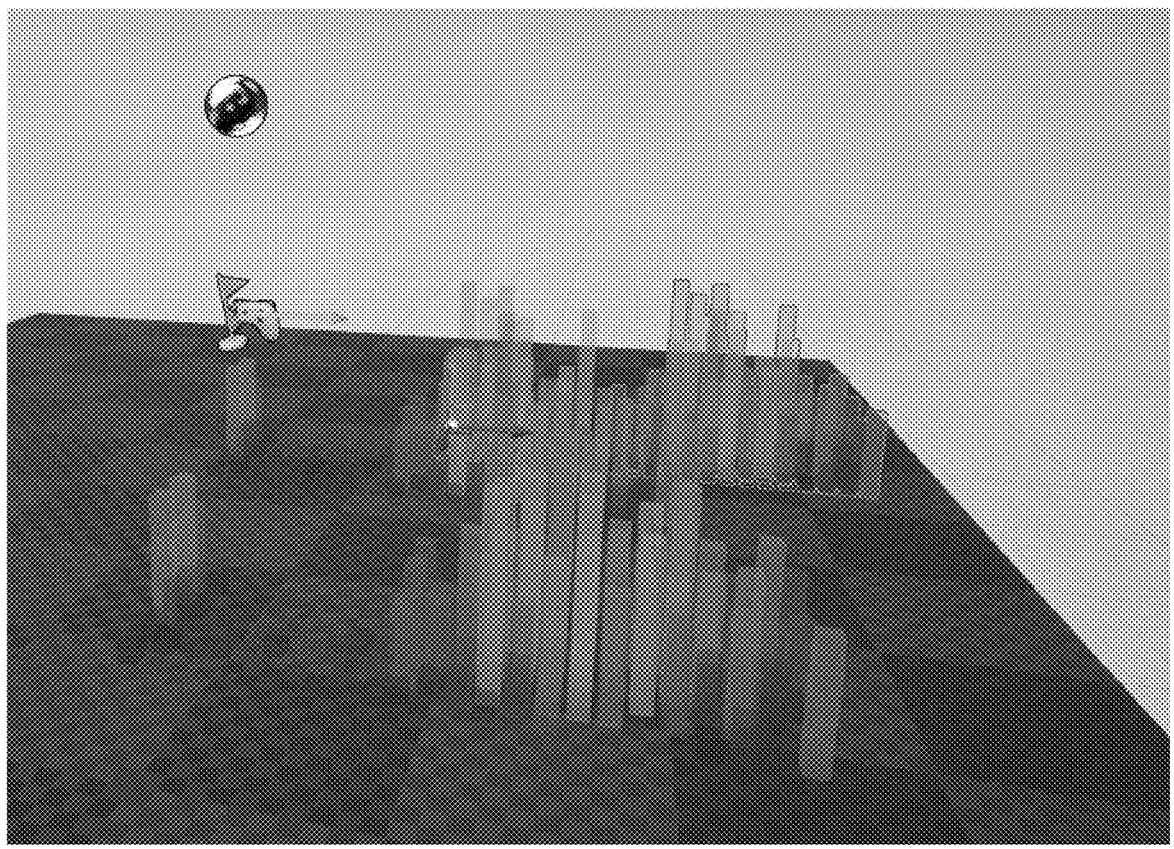
FIG. 2 is a schematic diagram of a columnar thermodynamic diagram according to an exemplary embodiment of the present disclosure.

In some exemplary embodiments, as shown in FIG. 2, the graphic to be constructed may be a thermodynamic diagram.

Thermodynamic diagram is a statistical chart that displays data by coloring color blocks. When drawing, a rule of color mapping is specified (the color of the chart is not shown in the drawings of the embodiments of the present disclosure). For example, larger values are represented by darker colors, and smaller values are represented by lighter colors; larger values are represented by warmer colors, smaller values by colder colors, and so on. In terms of data structure, the thermodynamic diagrams are generally divided into two types:

first, tabular thermodynamic diagram, also known as color block diagram, which needs 2 classification fields+1 numerical field, the classification fields determine X axis and Y axis, which divides the chart into regular rectangular blocks, the numeric field determines the color of the rectangular block;

second, non-tabular thermodynamic diagram (or smooth thermodynamic diagram), which needs three numerical fields, and can be drawn in parallel coordinate system (two numerical fields determine X axis and Y axis respectively, and one numerical field determines coloring).

An embodiment of the present disclosure is intended to create a first type of tabular thermodynamic diagram that is suitable for viewing the overall situation, discovering outliers, displaying differences between a plurality of variables, and detecting whether there is any correlation between them. It is noted that when drawing the thermodynamic diagram, it is recommended to choose the appropriate palette, which is not only visually easy to distinguish, but also in line with the main idea to be conveyed.

Scene description of thermodynamic diagram:

(1) The advantage of thermodynamic diagram lies in "high space utilization rate", which can accommodate huge data. Thermodynamic diagram is not only helpful to find the relationship between data and find the extreme value, but also often used to describe the overall appearance of data, which is convenient for comparison between data sets. For example, each athlete's achievements over the years are condensed into a thermodynamic diagram, and then compared.

(2) If a row or column is set as a time variable, the thermodynamic diagram can also be used to show the change of data with time. For example, it is clear at a glance to use the thermodynamic diagram to reflect the temperature change and climate trend of a city in a year.

(3) Although the thermodynamic diagram can accommodate more data, it is difficult for people to convert the color blocks into accurate numbers. Therefore, when it is required to know the numerical value clearly, additional annotations may be needed. In addition, a polar coordinate deformation of the thermodynamic diagram, that is, an annular thermodynamic diagram. It should be reminded that this chart is similar in appearance to charts such as Rising Sun Chart, but its functions are completely different, so it should be used with caution.

In some exemplary embodiments, the graphic to be constructed may be a columnar thermodynamic diagram, and its basic graphic may be a rectangular body (i.e., a hexahedron with rectangular faces), however, it is not limited in the embodiments of the present disclosure, and the shape of the basic graphic may also be other cylindrical shapes.

In some exemplary embodiments, the data to be displayed contains N target values, and drawing N of the basic graphics in sequence includes:

determining a number M of two-dimensional bases contained in the columnar thermodynamic diagram to be constructed according to a dimension N1 of a first data and a dimension N2 of a second data in the data to be displayed, wherein M=N1*N2;

determining a maximum target value and a minimum target value in the data to be displayed, and determining a coloring disk according to the determined maximum target value and the minimum target value, wherein the coloring disk includes a plurality of colors and a target data range corresponding to each color;

generating N rectangular bodies on the two-dimensional base corresponding to the N target values, wherein the height of each rectangular body is determined according to the size of the corresponding target value, and the color of each rectangular body is determined according to the color corresponding to the size of the corresponding target value in the coloring disk.

In the embodiment of the present disclosure, the data range of the coloring disk may be normalized or non-normalized, which is not limited in the embodiments of the present disclosure.

When displaying colors, there are three color channels: red (R), green (G) and blue (B). Each color channel has 256 brightness levels, and there are 256*256*256=16777216 color schemes in total, which cannot be distinguished in actual use. Considering that the thermodynamic diagram is a semantic chart, the graphic construction method according to an embodiment of the present disclosure employs a coloring disk (i.e., a palette) to determine the color corresponding to each target value.

Figure 3A:
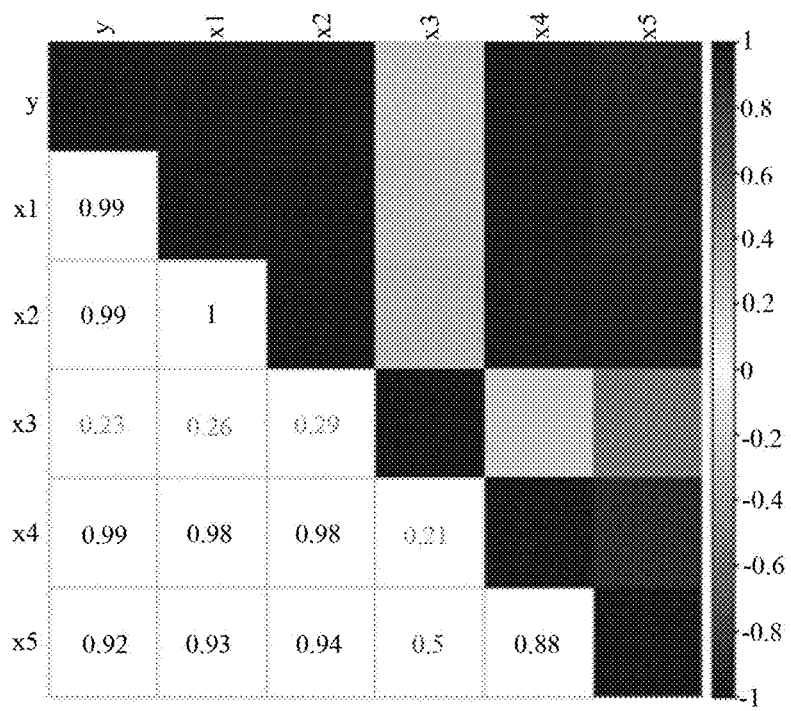
FIG. 3A is a schematic diagram of a correlation coefficient matrix and a coloring disk according to an exemplary embodiment of the present disclosure.

As an example, assuming that the maximum target value MAX and the minimum target value MIN in the data to be displayed are between −100 and 100, respectively (the maximum target value MAX and the minimum target value MIN may also be any other value, for example, the maximum target value MAX may be 300 and the minimum target value MIN may be −100, which is not limited in the embodiments of the present disclosure), the target data range is normalized, as shown in FIG. 3A, the data range corresponding to the coloring disk is between −1 and 1, a ratio of each target value to MAX is calculated, and the color of the corresponding rectangular body is determined according to the corresponding color of each ratio in the coloring disk.

In some exemplary embodiments, the color parameters of the columnar thermodynamic diagram include: a maximum data value max, a minimum data value min, a center value center, and a color mapping table colormap, wherein the maximum data value max, the minimum data value min, and the center value center can all be determined according to the data to be displayed. For example, in the coloring disk shown in FIG. 3A, max=1.0, min=−1.0, center=0, and the color mapping table colormap represents a corresponding mapping relationship from a numerical value to a color space, for example, (−1.0,−0.8) corresponds to a first color, (−0.8,−0.6) corresponds to a second color, (−0.6,−0.4) corresponds to a third color, (−0.4,−0.2) corresponds to a fourth color, (−0.2,0) corresponds to a fifth color, (0,0.2) corresponds to a sixth color, (0.2,0.4) corresponds to the seventh color, (0.4, 0.6) corresponding to the eighth color, (0.6, 0.8) corresponding to the ninth color, (0.8, 1.0) corresponding to the tenth color, the first color to the tenth color can be gradually changed; alternatively, the color corresponding to each value from (−1.0, 1.0) changes gradually.

Figure 3B:
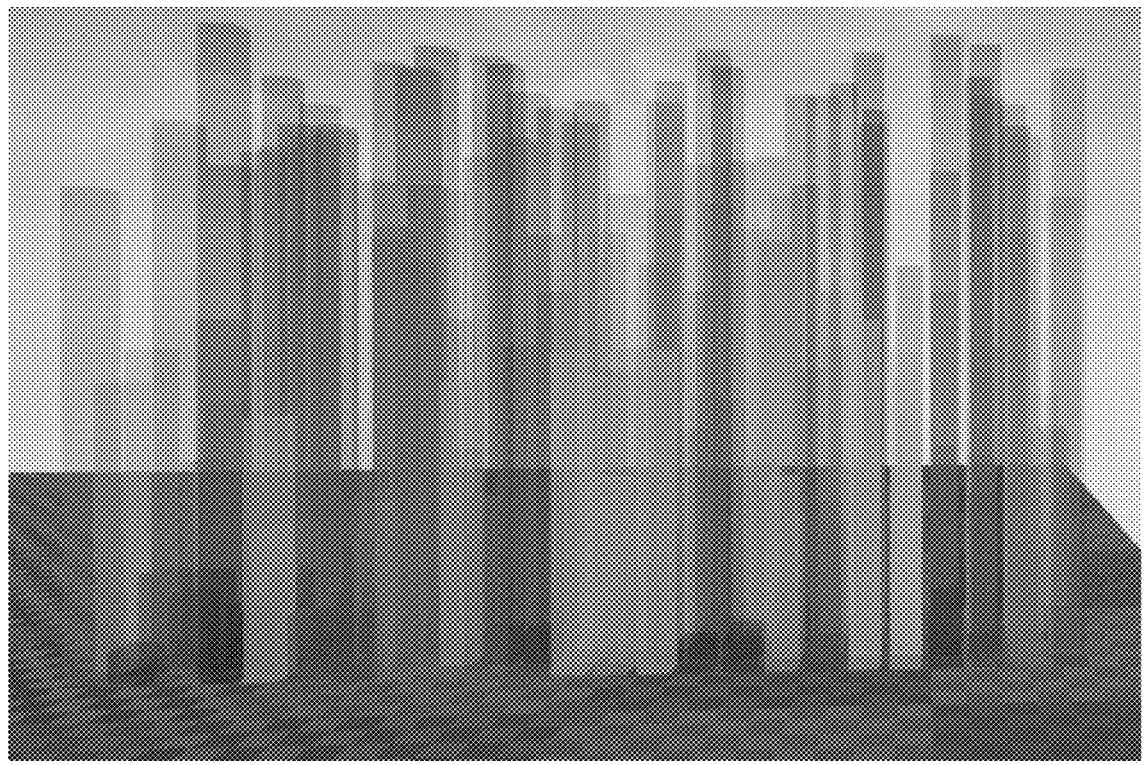
FIG. 3B is a schematic diagram of another columnar thermodynamic diagram according to an exemplary embodiment of the present disclosure.

In an embodiment of the present disclosure, the center value center represents the color center alignment value of the thermodynamic diagram. The overall shade of the color of the generated graphic can be adjusted by adjusting the color corresponding to the center value; when setting the center value center, the manually set max and min automatically change if there is a data overflow. For example, after the color parameter of the thermodynamic diagram in FIG. 2, the center value center, is changed, a new thermodynamic diagram effect is shown in FIG. 3B (the color of the thermodynamic diagram in FIG. 2 and FIG. 3B is not displayed, and in the actual display process, the overall color of FIG. 2 is blue and the overall color of FIG. 3B is red).

For example, if the value of MAX is 200 and one target value is 156, then a threshold percentage thereof is 0.78, the corresponding color can be determined by searching the color label corresponding to 0.78 in the coloring disk, and then the height of the corresponding rectangular body is set according to the target value or the threshold percentage to complete the construction of the basic graphics corresponding to the target value.

In some exemplary embodiments, the data to be displayed includes statistical characteristics of the first data of N1 dimension and statistical characteristics of the second data of N2 dimension, and drawing N of the basic graphics in sequence includes:

determining a number M of two-dimensional bases contained in the thermodynamic diagram to be constructed according to a dimension N1 of a first data and a dimension N2 of a second data in the data to be displayed, wherein M=N1*N2;

calculating a correlation coefficient between the first data of each dimension and the second data of each dimension according to statistical characteristics of the first data of the N1 dimension and statistical characteristics of the second data of the N2 dimension to obtain a correlation coefficient matrix including N non-zero values; determining a coloring disk, wherein the data range corresponding to the coloring disk is between −1 and 1;

generating N rectangular bodies on the two-dimensional base corresponding to the N non-zero values, wherein the height of each rectangular body is determined according to the size of the corresponding correlation coefficient value, and the color of each rectangular body is determined according to the color corresponding to the size of the corresponding correlation coefficient value in the coloring disk.

Exemplarily, the correlation coefficient may be Pearson correlation coefficient.

In statistics, Pearson correlation coefficient is used to measure the correlation (linear correlation) between two variables X and Y, and its value is between −1 and 1. When Pearson correlation coefficient is 0, it means that there is no linear relationship between the two variables. In the field of natural science, this coefficient is widely used to measure the correlation between two variables. Pearson correlation coefficient between two variables is defined as the quotient of covariance and standard deviation between two variables. The embodiment of the present disclosure can calculate the corresponding color threshold through Pearson correlation coefficient to distinguish colors.

Figure 4:
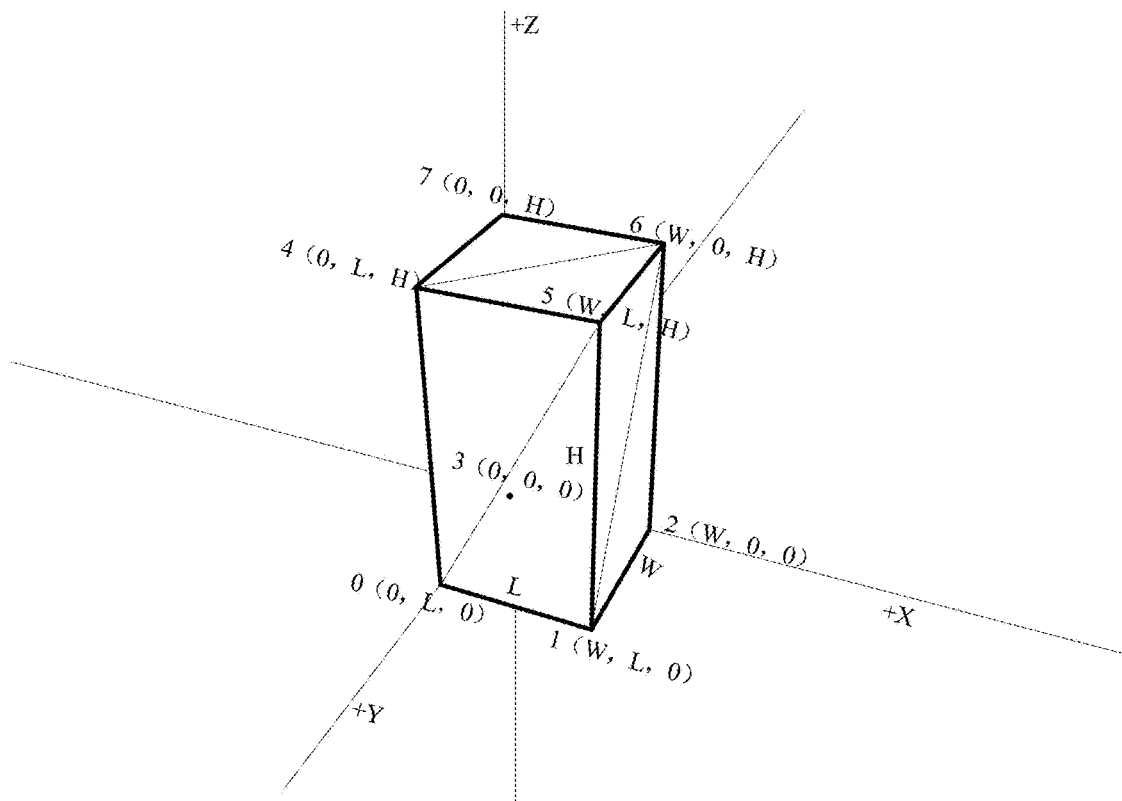
FIG. 4 is a schematic diagram of a rectangular body according to an exemplary embodiment of the present disclosure.

In some exemplary embodiments, as shown in FIG. 4, each rectangular body includes eight points, the eight points including a zero point, a first point, a second point, a third point, a fourth point, a fifth point, a sixth point, and a seventh point;

the Z-axis coordinates of the zero point, the first point, the second point and the third point are the same, the X-axis coordinates of the zero point, the third point, the fourth point and the seventh point are the same, and the Y-axis coordinates of the second point, the third point, the sixth point and the seventh point are the same.

In an embodiment of the present disclosure, the coordinates of eight points of each rectangular body can be determined according to the initial position coordinates (i.e., the coordinates of the third point), a bottom surface length L, a bottom surface width W and a height H of each rectangular body.

The initial position coordinates of the rectangular body exemplified in FIG. 4 is the coordinate origin of the XYZ three-axis coordinate system, so the Z-axis coordinates of the four Points 0, 1, 2, and 3 are 0, the X axis coordinates of 0, 3, 4 and 7 points are 0, the Y-axis coordinates of points 2, 3, 6 and 7 are 0.

Since the coordinates of the fifth point include the bottom length L, the bottom width W and the height H of the rectangular body, all the coordinates of other points can be inferred from the coordinates of the fifth point. As an example, the coordinates of the fifth point can be used as a threshold control valve to control the color of the rectangular body.

In some exemplary embodiments, the bottom surface of each rectangular body may be square, assuming that the plane area of the XY axis region corresponding to the target is S, and each rectangular body has a bottom surface width of W and a length of L, then $W=L=\sqrt{S/(N1*N2)}$. However, embodiments of the present disclosure are not limited thereto, and the bottom surface of each rectangular body may also be rectangular.

In some exemplary embodiments, generating one rectangular body includes:
 calculating coordinates of eight points of a rectangular body;
 generating six faces of the rectangular body, wherein each face of the rectangular body is composed of two triangles, and each triangle is composed of three of the eight points.

In an embodiment of the present disclosure, the remaining N−1 rectangular bodies can correspondingly copy the rules of the first rectangular body, and according to the height H of each rectangular body, the color of each rectangular body is controlled to complete the deployment of a matrix of columnar stacking.

Figure 5:
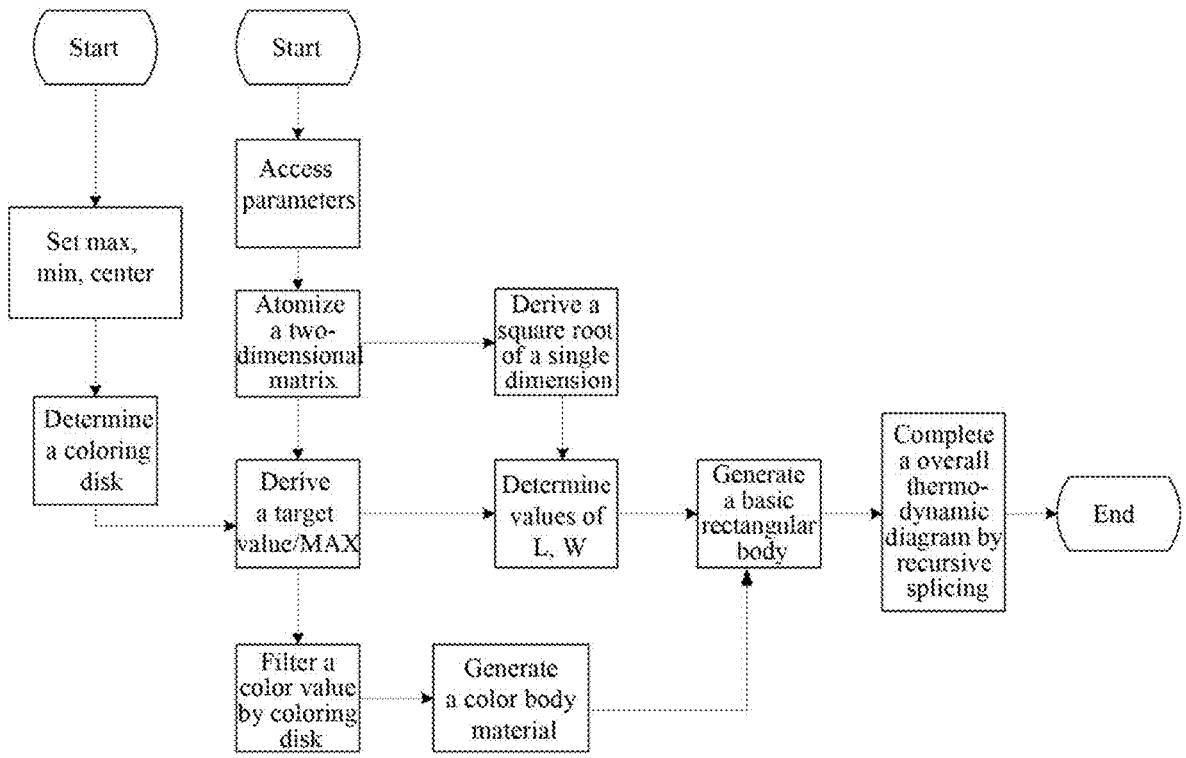
FIG. 5 is a flow diagram of a building method for a columnar thermodynamic diagram according to an exemplary embodiment of the present disclosure.

In some exemplary embodiments, as shown in FIG. 5, an exemplary graphic construction method includes the following steps: accessing parameters (i.e. receiving data to be displayed), performing gridded split according to the first data dimension N1 and the second data dimension N2 of the accessed parameters (where the first data dimension N1 and the second data dimension N2 may be the same or different), determining the number M of two-dimensional bases contained in the graphic to be constructed, where M=N1*N2, and calculating the values of the bottom width W and the length L of each rectangular body; at the same time, determining color parameters: a maximum data value max, a minimum data value min, and a center value center, determining a coloring disk (i.e., a color mapping table colormap) according to the determined color parameters, calculating a ratio of the target value in each data to be displayed to the maximum target value MAX, and selecting the corresponding color in the coloring disk according to the calculated ratio to generate a corresponding color body material; generating the basic rectangular body shape (in which the height H of the rectangular body can be determined according to the ratio or target value) according to a bottom width W and a length L of each rectangular body and the generated corresponding color body material, and constructing the overall thermodynamic diagram by recursive splicing.

In some exemplary embodiments, the material of the rectangular body is exposed to the blueprint layer, and the material of the rectangular body may be a transparent material or an opaque material.

In an embodiment of the present disclosure, the material of the rectangular body is exposed to the blueprint layer in the Editor, and these contents can be controlled in the underlying C++ code, so that various secondary development capabilities can be accepted. An example piece of underlying code is as below:

```
UFUNCTION (BlueprintCallable)
Void SetValue (const Fstring & InValue);
UPROPERTY (EditAnywhere, Category = "Bar3DpuchCard")
UmaterialInterface* Material0;
``` wherein, a method that can be called by blueprint is defined by the function declaration UFUNCTION. The material properties of the columnar thermodynamic diagram are exposed to the blueprint layer through the attribute descriptor UPROPERTY.

This is a parameterized example. If it is required to bind the animation, then the corresponding animation interface is exposed. If transparency and illumination reflection need to be exposed, a corresponding Alpha channel can be exposed to the blueprint layer, where the Alpha channel is used to record transparency information in the image.

In the embodiment of the present disclosure, after the color parameters are determined, the color copy of a vertex shader is completed through the material instantiation scheme of the unreal engine itself, and the transparency in the corresponding parameters is set, so as to complete the overall graphic construction.

Figure 6A:
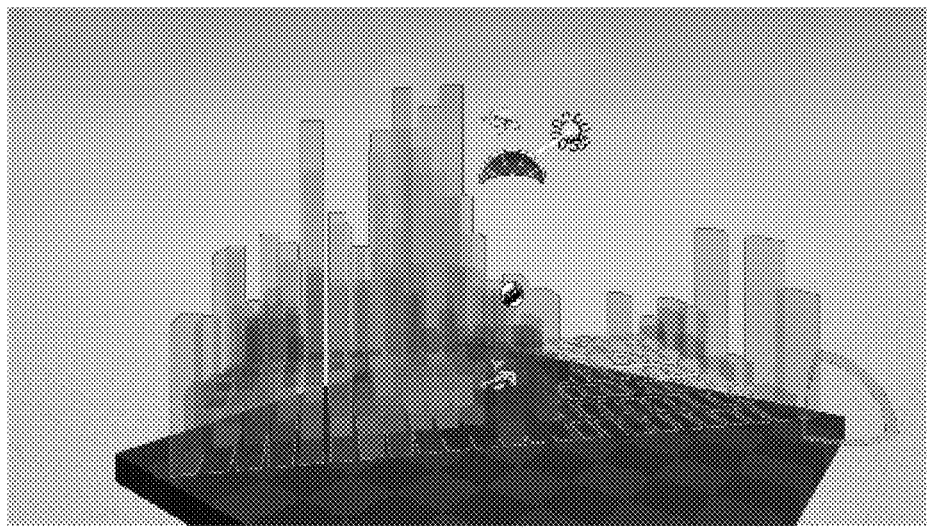
FIG. 6A and FIG. 6B are schematic diagrams of another two columnar thermodynamic diagrams according to an exemplary embodiment of the present disclosure.
Figure 6B:
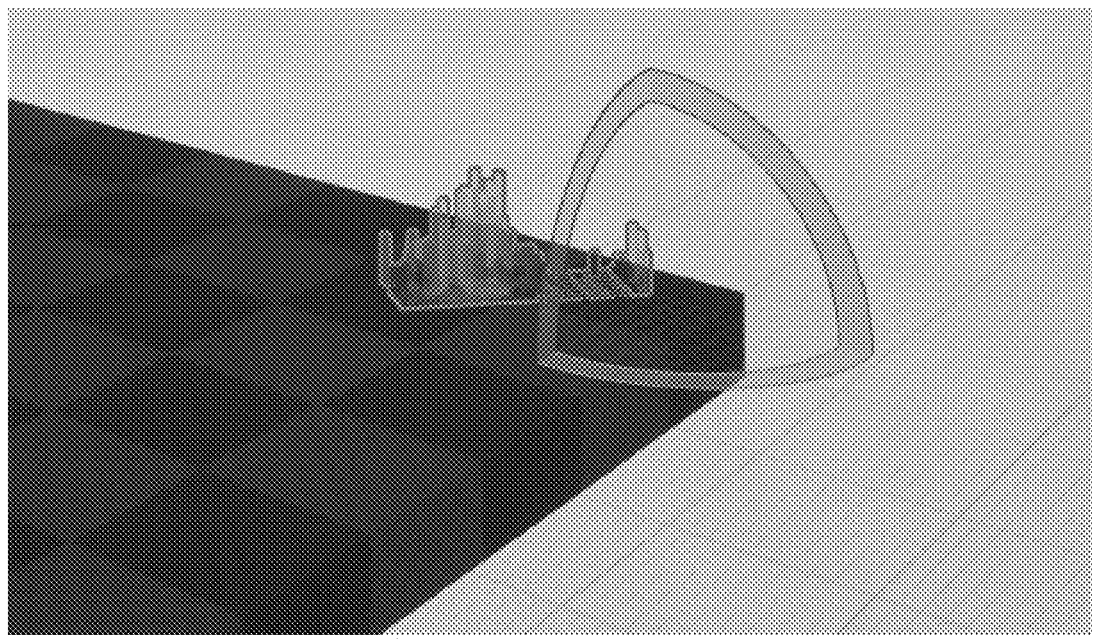

As shown in FIGS. 6A and 6B, the thermodynamic diagram constructed by the embodiment of the present disclosure can be better fitted and displayed for different scene sizes, and the constructed thermodynamic diagram can match arbitrary rotation, enlargement and reduction like other arbitrary model bodies.

Figure 7:
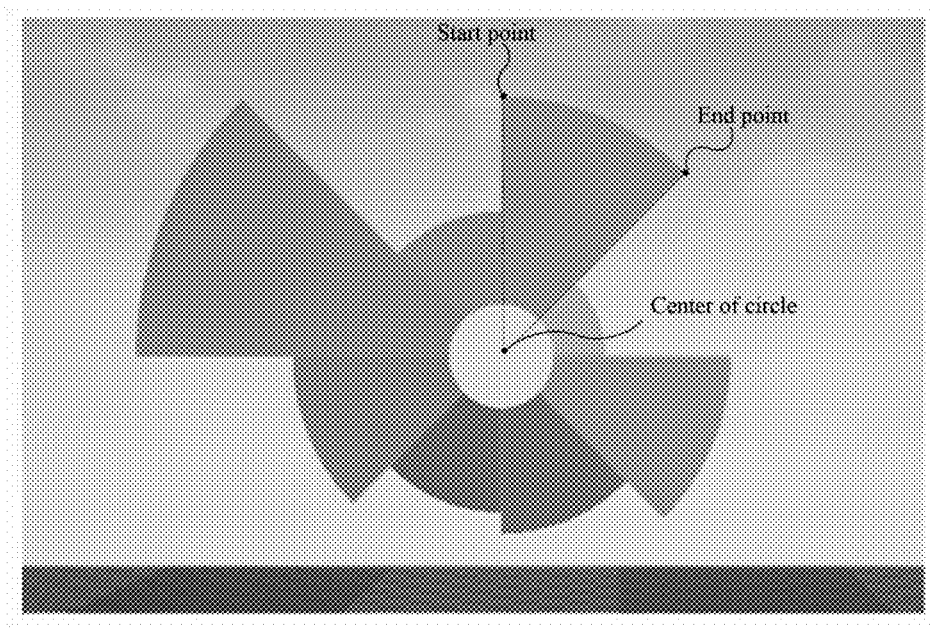
FIG. 7 is a schematic diagram of a Nightingale rose diagram according to an exemplary embodiment of the present disclosure.

In some exemplary embodiments, as shown in FIG. 7, the graphic to be constructed may be a Nightingale rose diagram, the basic graphic of which may be a fan.

As one of the most intuitive and excellent expression modes of polar coordinate statistical analysis in data visualization, Nightingale rose diagram has gradually become an irreplaceable link in data visualization. The graphic construction method according to an embodiment of the present disclosure can realize the original expression of the corresponding Nightingale rose diagram by using mathematical calculation in the unreal engine.

In some exemplary embodiments, the data to be displayed includes data of N dimensions, and drawing N of the basic graphics in sequence includes:

determining coordinates of a center position;
determining an angle of each fan $\partial$, where $\partial=360/N$;
drawing N fans in sequence, wherein a start angle of an i-th fan is $(i-1)*<\partial$, an end angle of the i-th fan is $i*\partial$, an outer diameter of the i-th fan is determined according to a size of a target data value in data of an i-th dimension, $1 \leq i \leq N$.

In the embodiment of the present disclosure, the construction idea of Nightingale rose diagram is double circle fitting of concentric polar coordinates, the inner diameter circle can be transparent (the inner diameter can be 0, that is, there is no inner diameter circle), the outer diameter determines the corresponding fan radius through binding data, and the angle of each fan is bisected according to the statistical dimension. If the statistical dimension includes merging and processing, a minimum radius (Radius) needs to be set for micro-differentiation superposition. Although the Nightingale rose diagram is finally presented as a circle, it can be understood as an external splicing of triangles with the same vertex because the angle of micro-differentiation is extremely small.

In some exemplary embodiments, as shown in FIG. 7, each fan includes three points: a center of a circle, a start point, and an end point;

in each fan, an angle between a line from the center of the circle to the start point and a line from the center of the circle to the end point is equal to a, a length of the line from the center of the circle to the start point is equal to a length of the line from the center of the circle to the end point.

In some exemplary embodiments, the material and color of the fan is exposed to the blueprint layer, and the material of the fan is a transparent material or an opaque material.

In the embodiment of the present disclosure, when the underlying function is compiled, the interface can be exposed to the unreal engine blueprint layer according to the corresponding parameters, and an exemplary underlying code is as follows:

```
UFUNCTION (BlueprintCallable)
Void SetValue (TArray < float > In Values);
UPROPERTY (EditAnywhere, Category = "Nightingale")
FVector2D CenterPosition = FVector2D (300. F, 300. F
UPROPERTY (EditAnywhere, Category = "Nightingale")
float IR = 50;
UPROPERTY (EditAnywhere, Category = "Nightingale")
TArray < FLinerColor > Colors;
``` wherein, a method that can be called by blueprint is defined by function declaration UFUNCTION, and SetValue represents a data set scope that needs to generate Nightingale rose diagram. Through the attribute descriptor UPROPERTY, the center position of the circle CenterPosition, the inner diameter IR and the corresponding color of each fan Colors are defined.

the center position of the circle CenterPosition represents the start point of concentric coordinate system, in the above code, CenterPosition=FVector2D (300. F, 300. F), which is just an example, Fvector3D coordinates can also be used to bind the World mapping coordinate relationship in the unreal engine and complete the mapping corresponding to the space world+screen world.

In the above code, the inner diameter IR=50, where 50 is only a mark of the smallest unit, which has no practical significance.

Figure 8A:
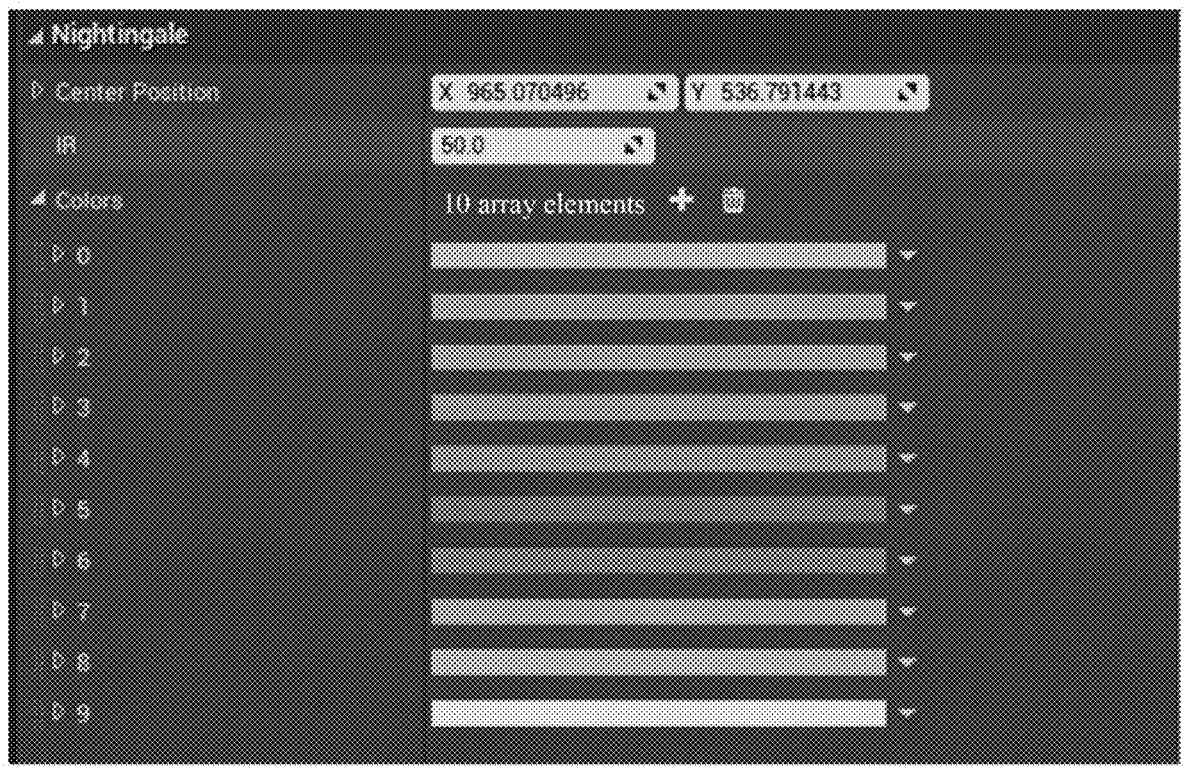
FIG. 8A is a schematic diagram of a color setting method for a Nightingale rose diagram according to an exemplary embodiment of the present disclosure.

The color array Colors contains the display color corresponding to each fan. As shown in FIG. 8A, the user can set the color array Colors at the blueprint layer, thereby setting the color corresponding to each fan.

Figure 8B:
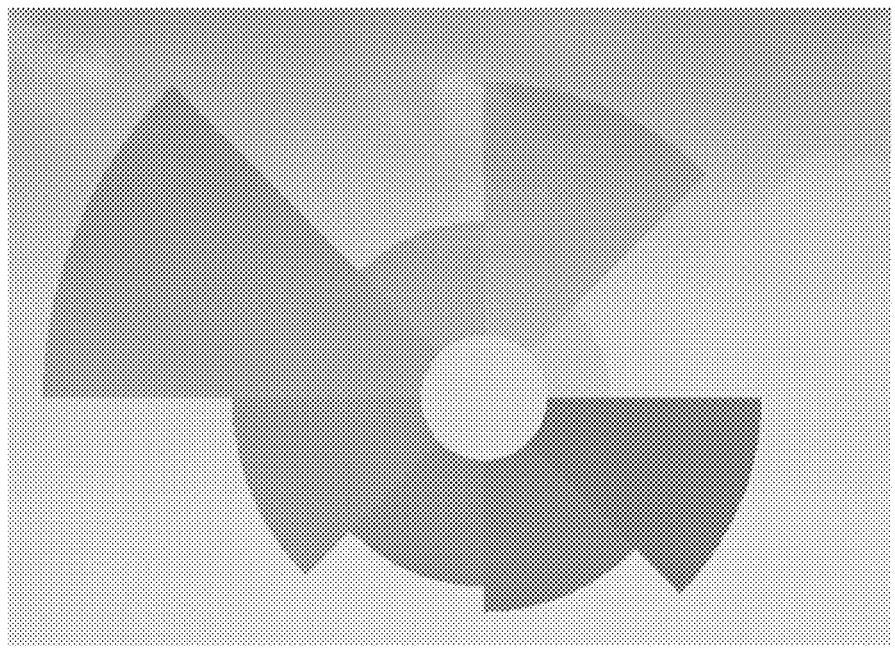
FIG. 8B is a schematic diagram of another Nightingale rose diagram according to an exemplary embodiment of the present disclosure.

The above is just a parameterized example. If it is required to bind animation, the corresponding animation interface can be exposed; if transparency and illumination reflection need to be exposed, the corresponding Alpha channel can be exposed to the blueprint layer, as shown in FIG. 8B (each fan in FIG. 8A is different in color, each fan in FIG. 8B is the same in color, but different in transparency), and, for example, the transparency in FIG. 8B gradually varies clockwise from 0.1 to 0.9.

The graphic construction method according to an embodiment of the present disclosure can be replicated by using the NativePaint manner of the unreal engine. Since the external triangle is essentially used for fan splicing, as long as two points are controlled as the central axis, the point CurrentEVPosition as a current start point A, which is rotated by a minimum vector angle and become a NexEVPosition, the point CurrentIVPosition as a current end point B, which is rotated by a same angle and multiplied by a vector in the radius direction of the center of the circle and become a translation end point NextIVPosition.

Figure 8C:
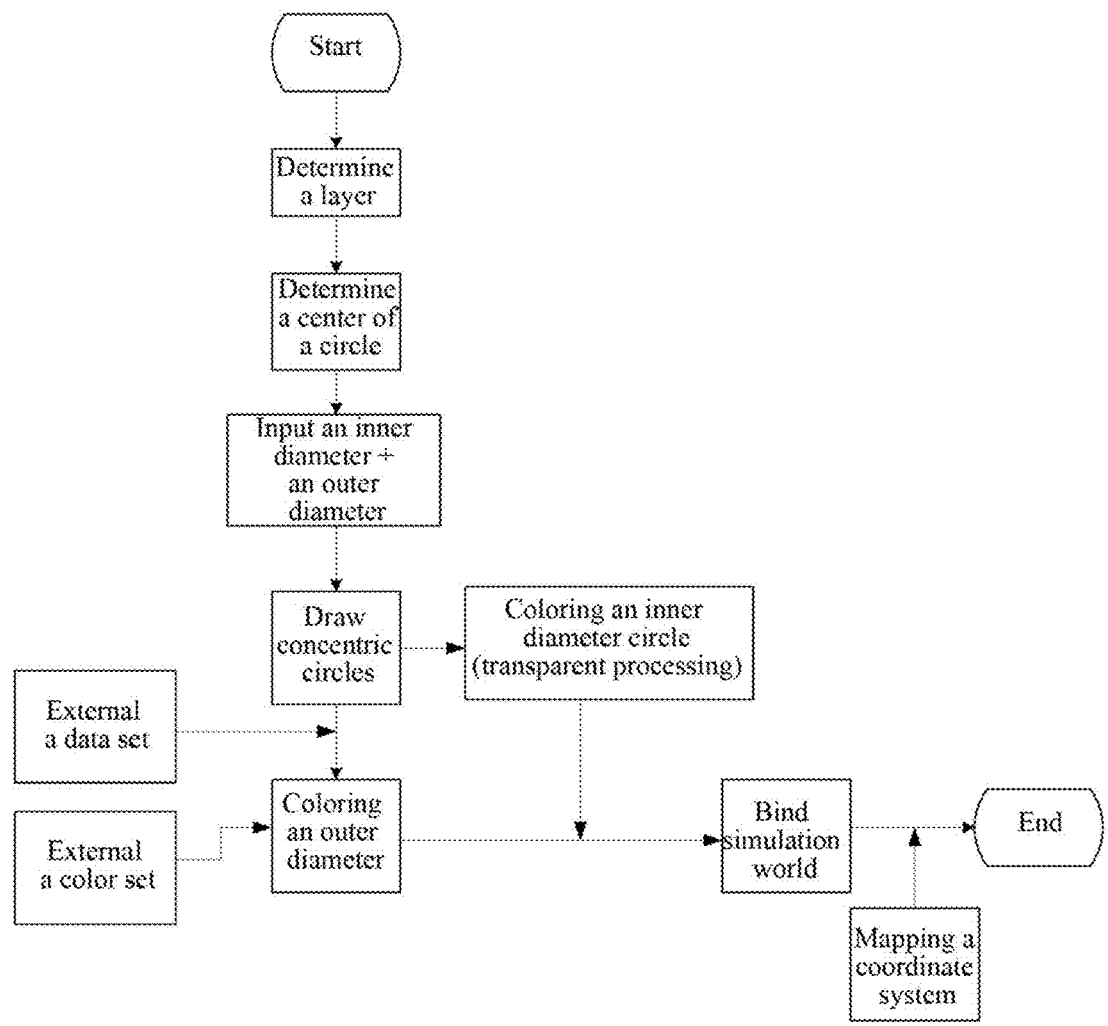
FIG. 8C is a flow diagram of a construction method for a Nightingale rose diagram according to an exemplary embodiment of the present disclosure.

As shown in FIG. 8C, an exemplary graphic construction method includes the following steps: determining a layer, determining a center position coordinate; receiving an inner diameter and an outer diameter input by user (which can also be automatically calculated by program), drawing concentric circles (i.e. n inner diameter circles); receiving an external data set (i.e. data to be displayed) and an external color set; determining a number N of fans contained in a Nightingale rose diagram to be constructed according to dimensions of the data to be displayed, and an angle of each fan is determined $\partial$, where $\partial=360/N$; drawing N fans in sequence, wherein a start angle of an i-th fan is $(i-1)*\partial$, an end angle of the i-th fan is $i*\partial$, an outer diameter of the i-th fan is determined according to the size of a target data value in data of i-th dimension, and coloring each fan according to the external color set, binding simulation world, and mapping a coordinate system for display.

The graphic constructed by the embodiments of the present disclosure can be in layer expression, for example, placed at a certain position on the screen; it can also be in non-layer expression, that is, the constructed graphics are independent. For example, when the user clicks a button, the constructed graphic will pop up. Both layer representation and non-layer representation can be adopted, which way depends on business requirement.

Figure 9:
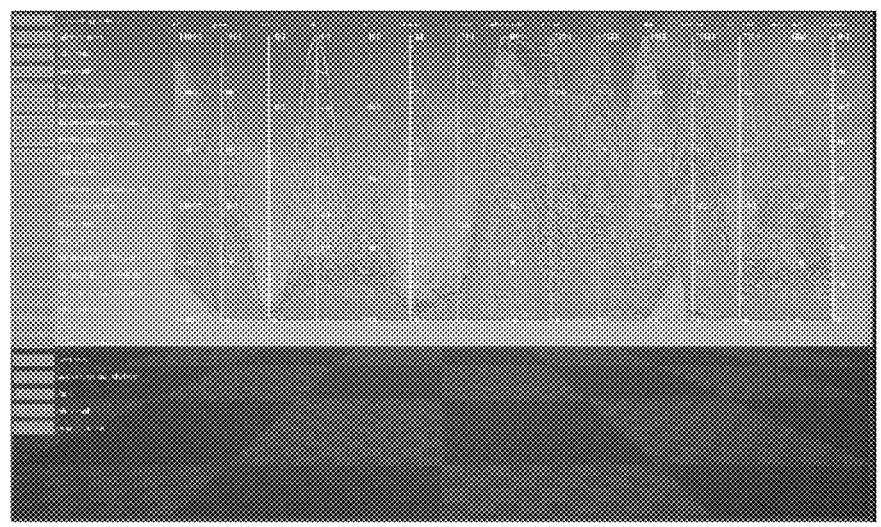
FIG. 9 is a schematic diagram of a parallel coordinate map according to an exemplary embodiment of the present disclosure.

In some exemplary embodiments, as shown in FIG. 9, the graphic to be constructed may be a parallel coordinate system curve graph with concurrent multi-dimensions (referred to as a parallel coordinate graph in the present disclosure), the basic graph of which may be a Bezier curve.

As one of the most intuitive and excellent expression modes of statistical analysis in data visualization, parallel coordinate graph has gradually become an irreplaceable link in data visualization. The graphic construction method according to an embodiment of the present disclosure stresses in realizing the original expression of the corresponding parallel coordinate graph by using mathematical calculation in the unreal engine.

Figure 10A:
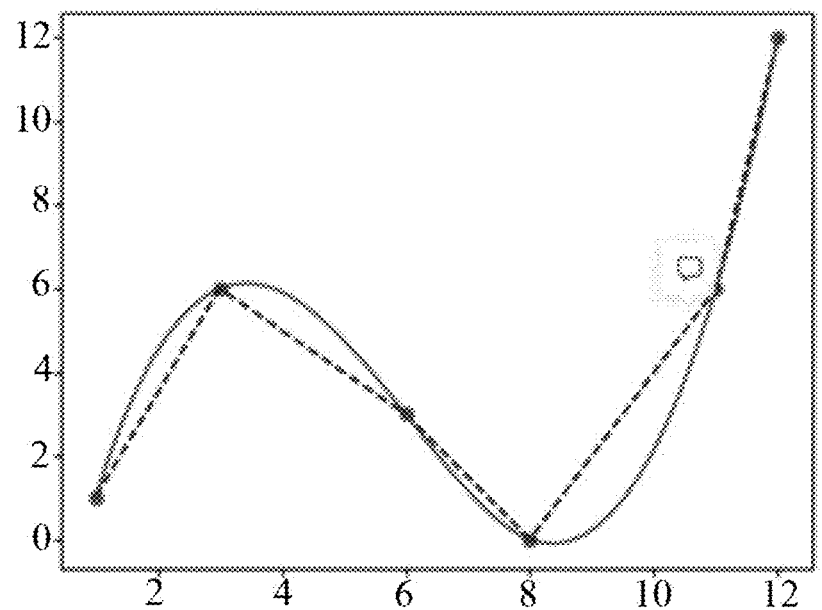
FIG. 10A is a schematic diagram of a smooth curve according to an exemplary embodiment of the present disclosure.

In an embodiment of the present disclosure, the parallel coordinate graph is disassembled into a sub-smooth Bezier curve between two very close points, and a plurality of successive sub-Bezier curves are connected to form one smooth curve. As shown in FIG. 10A, in which there are six discrete connection points (1, 1), (3, 6), (6, 3), (8, 0), (11, 6), (12, 12), in the embodiments of the present disclosure, it is studied that how a smooth curve (the solid line in the figure) is generated by interpolation instead of a rigid multi-segment line (the dashed line in the figure).

In some exemplary embodiments, the data to be displayed may include data of N dimensions, data of each dimension includes a plurality of discrete connection points, and drawing an i-th basic graphic includes:

acquiring all discrete connection points in data of i-th dimension;

generating two control points between every two adjacent discrete connection points, wherein the two control points causes a sub-Bezier curve to be generated between the two adjacent discrete connection points, and a connection point between the two adjacent sub-Bezier curves and the control points on both sides of the connection point are collinear;

generating a Bezier curve connecting all discrete connection points in the data of i-th dimension according to the generated control points, wherein a connection line of a connection point and two control points adjacent to the connection point is tangent to the Bezier curve, $1 \leq i \leq N$.

Figure 10B:
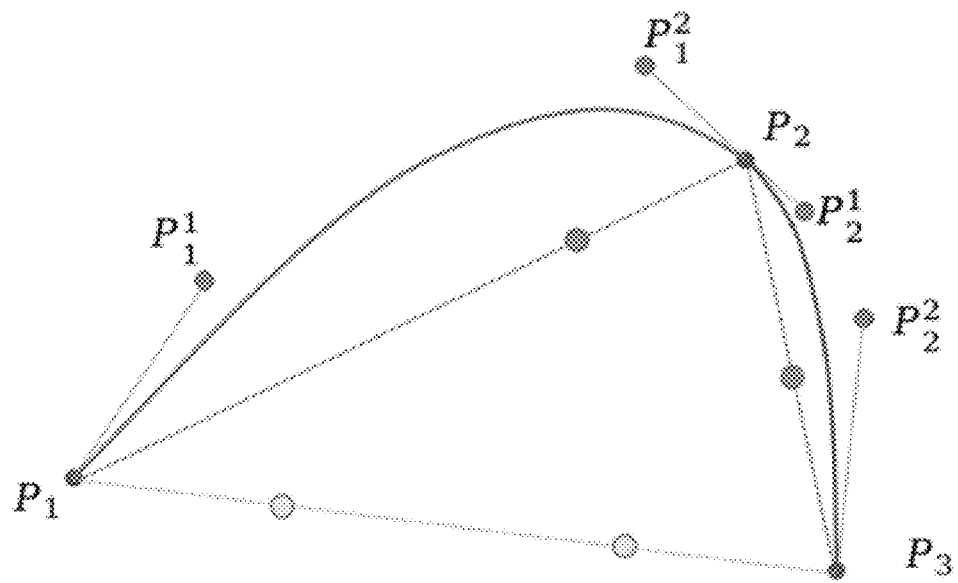
FIG. 10B is a schematic diagram of a generation method for a smooth curve according to an exemplary embodiment of the present disclosure.

As shown in FIG. 10B, the Bezier curve is generated by control points, and not all the control points are on the final curve. The first point and the last point in the control points are terminal points of the final curve (that is, the first and last control points will be on the final curve), and their connection lines with adjacent control points are tangent to the final curve. If two sub-Bezier curves are connected smoothly, the connection points need to be collinear with their control points at their left and right adjacent ends. The control points should be set to satisfy the smoothness when the sub-Bezier curves are connected.

That is, a sub-Bezier curve is generated in two discrete connection points, and these two points serve as two terminal points of the sub-Bezier curve. Then two additional control points are determined, and the control point are set to satisfy that the connection points of two adjacent sub-Bezier curves are collinear with the control points at the left and right side of the connection points. FIG. 10B is a smooth curve composed of two sub-Bezier curves, and each sub-Bezier curve needs to be provided with two control points.

In some exemplary embodiments, the material and color of the Bezier curve are exposed to the blueprint layer, and the material of the Bezier curve is a transparent material or an opaque material.

In the embodiment of the present disclosure, when the underlying function is compiled, the interface can be exposed to the blueprint layer of the unreal engine according to the corresponding parameters, and the manner of externally exposing the blueprint interface depends on the control manner of the underlying code and the corresponding business logic. Exemplary, exposed parameters may include:

InValue: representing a range of a data set that is required to generate the parallel coordinate graph;

RectValue: a spacing length, used to determine a distinguishing dimension of the start axis of the Bezier curve.

Colors: display colors corresponding to the parallel coordinate graph.

Obviously, the above is only a parameterized example. If it is required to bind animation, the corresponding animation interface can be exposed. If it is required to expose transparency and illumination reflection, the corresponding Alpha channel can be exposed to the blueprint layer.

The graphic construction method according to an embodiment of the present disclosure can be replicated by using the NativePaint manner of the unreal engine, and each curve is smoothly connected by Bezier curves on a plurality of discrete connection points.

Figure 11:
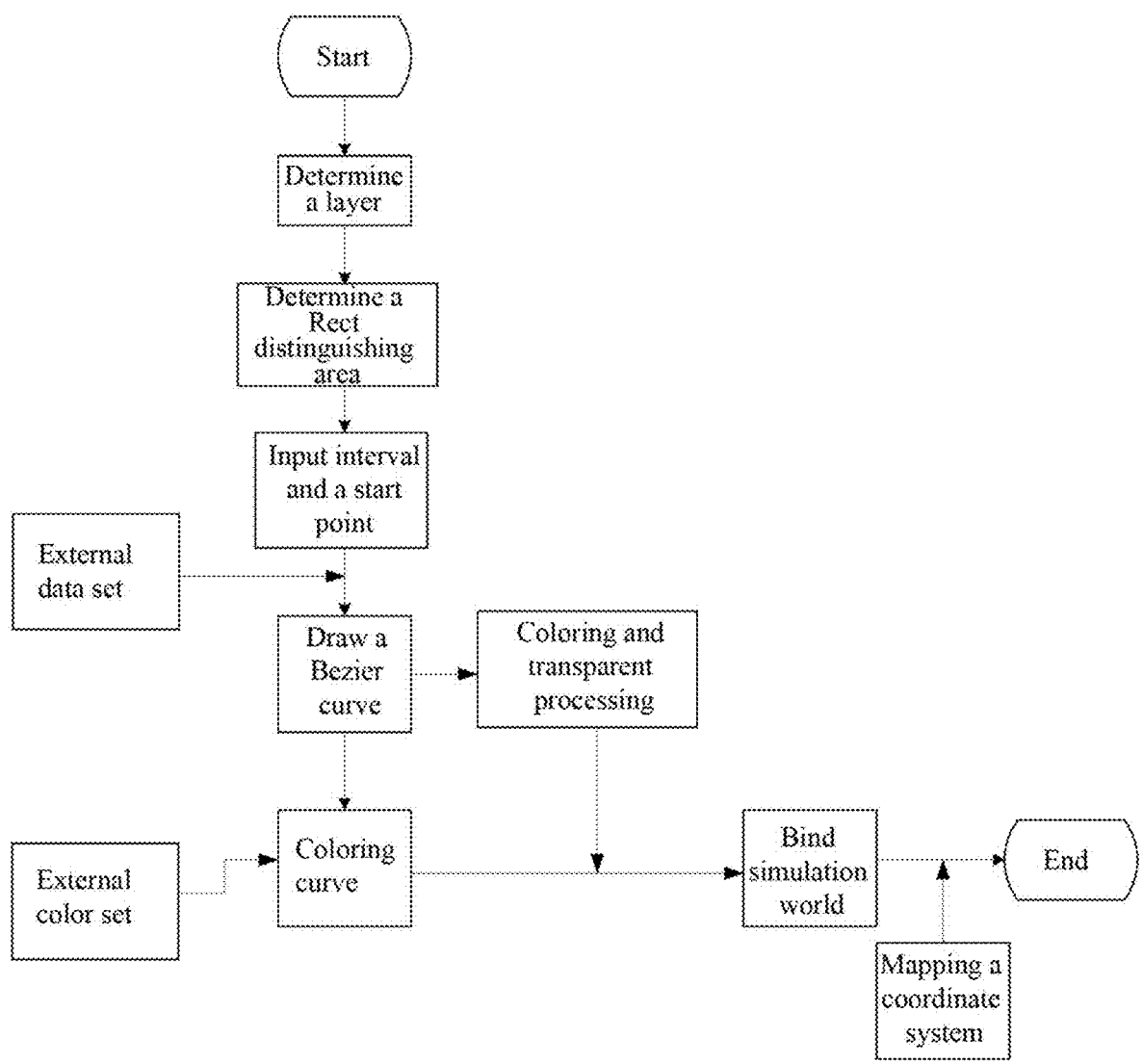
FIG. 11 is a schematic diagram of a construction method for a parallel coordinate map according to an exemplary embodiment of the present disclosure.

As shown in FIG. 11, an exemplary graphic construction method includes the following steps: determining a layer; determine a Rect distinguishing area; inputting interval and start point; receiving an external data set (i.e. data to be displayed) starting to draw Bezier curve; determining a number N of Bezier curves contained in the parallel coordinate graph to be constructed according to the dimensions of the data to be displayed, generating two control points between every two adjacent discrete connection points for data of i-th dimension, wherein the two control points causes a sub-Bezier curve to be generated between the two adjacent discrete connection points, and the connection points between two adjacent sub-Bezier curves are collinear with the control points on both sides of the connection points; generating a Bezier curve connecting all discrete connection points in the data of i-th dimension according to the generated control points, and a connection line of a connection point and two control points adjacent to the connection point is tangent to the Bezier curve, $1 \leq i \leq N$; receiving an external color set, coloring each Bezier curve according to the external color set, binding a simulation world, and mapping a coordinate system for display.

The graphic constructed by the embodiments of the present disclosure can be in layer expression, for example, placed at a certain position on the screen; it can also be in non-layer expression, that is, the constructed graphics are independent. For example, when the user clicks a button, the constructed graphic will pop up. Both layer representation and non-layer representation can be adopted, which way depends on business requirement.

In the embodiment of the present disclosure, the graphic to be constructed can also be other arbitrary graphic, and which will no longer exemplified one by one in the embodiments of the present disclosure, and can be constructed with reference to the graphic construction method above.

The unreal engine graphic construction method according to an embodiment of the present disclosure adopts a low code manner to realize the columnar thermodynamic diagram, the parallel coordinate system curve graph with concurrent multi-dimensions, the Nightingale rose diagram and the like commonly used in the data visualization in the unreal engine, so as to solve the problem that the data diagram cannot move along with the scene and the lens switching at current, and solve the problem that the currently used Echarts technical system is limited to the architecture of the Web container. In the embodiment of the present disclosure, the corresponding data model interface is exposed by using low code to satisfy the ability of improving development efficiency and realizing data visualization, and greatly reduces the display and development cycle of the three-dimensional graphic with the unreal engine. By using low code mode, it can be compatible with the use of two roles: program developer and art developer; at the same time, using C++ as the underlying layer also has strong cross-platform compatibility.

The graphic construction method according to an embodiment of the present disclosure can be applied to the application scenarios of the entire industry, such as smart parks, smart cities, digital villages, rail transit, judicial supervision, emergency command, schools, hospitals, electric power and the like.

As shown in FIG. 11, for example, in a smart park technical scheme, the whole system is composed of the following two terminals:

I: Service/Central Control Terminal the service/central control includes the following three layers:

1) Data Board Layer

With Web container/visualization chart as the main core display capability, data display is completed through traditional TCP/IP communication protocol, and corresponding instructions are sent to the model twin layer when the data board layer is manipulated, processed or with data being changed.

2) Model Twin Layer

With rendering engine as the core development ability, supplemented by program+art rendering, a program constructed according to real scenes is formed. The model twin layer includes an ability to parse and receive instructions/data commands, an ability to move space and corresponding scripted processing realized by roaming technology, and an ability to call multi-dimensional scenes, and an ability to feed back the changed effects to the display device.

3) Service and Communication Layer

The service and communication layer mainly includes the following contents: data transfer in traditional communication logic, transfer of operation control instructions, transfer of rendering stream fed back by model layer, etc.

II: Access Client/Distributed Client

The access client/distributed client includes various kinds of mobile devices, which are bound by streaming media addresses sent by the model terminal, and at the same, prepares corresponding access manner and interactive logic according to their business needs.

In addition, in the product direction, the overall digital twinning+virtual simulation system is generally established through a production layer, a processing layer and a product layer.

1. Production Layer

Step 1: pulling data by means of GIS engine (such as Cesium) through open source official data platforms such as OpenStreetMap/TianDiTu, including but not limited to longitude and latitude, FloorHeight, Digital Elevation Models Dem and POI (Point of Interest) point information.

Step 2: performing three-dimensional data processing through box three-dimensional pulling, such as CE platform, Blender platform, TwinMotion platform, and the like to form a common first-level (L1) white film.

Step 3: bringing in artists at this time to complete the docking of artistic effects, such as processing of stair material, lighting effect, model body, post-material, and the like to form a basic second-level (L2) model. Meanwhile, developers will access at this time to complete the corresponding data repair, such as replacing old data or deleting redundant data.

Step 4: finally forming model body files such as FBX/obj/3ds and the like.

2. Processing Layer

Step 1: the processing layer accesses the model files output through the production layer for secondary development, wherein the main purpose at this time is to merge the data that need Inversion of Control (IOC) and figurative representation, and the products of the state+processing layer into the scene of overall demand, and complete the creation of three-dimensional scene by means of virtual engine in terms of the merging manner.

Step 2: after the preliminary construction is completed, it being necessary to bind the corresponding traditional capabilities, for example, the non-business logic capabilities such as illumination, day and night alternation, weather system, and the like, and bind the scene effects in the night scene state, that is, luminous texture and global lighting, etc.

Step 3: binding real business logic, such as POI point information, corresponding POI point distribution, and auxiliary but necessary functions such as roaming+lens offset.

Step 4: fitting the data board with the scene model as a whole and outputting it to the product layer.

3. Product Layer

Step 1: binding a built-in push capability plug-in of the camera to the scene and binding a remote streaming media server.

Step 2: binding an instruction receiving module to the scene and dynamically monitoring the data from IOC+data board.

Step 3: performing integrated packaging according to the corresponding platform and publishing it to the corresponding address.

Step 4: setting routine software parameters, such as the startup mode of the program and the corresponding on-off status identification on the target platform, after completion. BAT files are usually used here for batch/registry processing completion.

The unreal engine graphic construction method according to an embodiment of the present disclosure can bind data (for example, data of a receiving sensor) through the processing layer and present it to an terminal user at the product layer.

An embodiment of the present disclosure further provides an unreal engine graphic construction apparatus, including a memory and a processor connected to the memory, the memory is configured to store instructions, the processor is configured to perform steps of an unreal engine graphic construction method according to any embodiment of the present disclosure based on the instructions stored in the memory.

Figure 12:
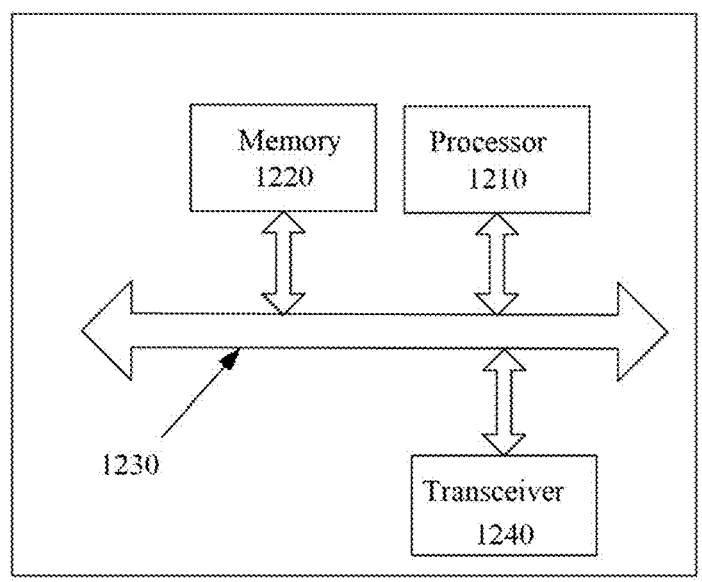
FIG. 12 is a schematic structural diagram of an unreal engine graphic construction apparatus according to an exemplary embodiment of the present disclosure.

As shown in FIG. 12, in an embodiment, the unreal engine graphic construction apparatus may include: a processor 1210, a memory 1220, a bus system 1230, and a transceiver 1240, wherein the processor 1210, the memory 1220, and the transceiver 1240 are connected via the bus system 1230, the memory 1220 is configured to store instructions, and the processor 1210 is configured to execute the instructions stored in the memory 1220 to control the transceiver 1240 to receive and send signals. Specifically, the transceiver 1240 may receive data to be displayed under the control of the processor 1210, and the processor 1210 determines a number N of basic graphics included in the graphic to be constructed according to the data to be displayed, where N>1; the underlying function is called at the blueprint layer to draw N of the basic graphics in sequence, and the underlying function is used for creating the basic graphics.

It should be understood that the processor 1210 may be a Central Processing Unit (CPU), or the processor 1210 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor, or the processor may be any conventional processor, etc. The general-purpose processor may be a microprocessor, or the processor may be any conventional processor, etc.

The memory 1220 may include a read only memory and a random access memory, and provides instructions and data to the processor 1210. A portion of the memory 1220 may also include a non-volatile random access memory. For example, the memory 1220 may also store information of a device type.

The bus system 1230 may include a power bus, a control bus, a status signal bus, or the like in addition to a data bus. However, for clarity of illustration, various buses are all denoted as the bus system 1230 in FIG. 12.

In an implementation process, processing performed by a processing device may be completed through an integrated logic circuit of hardware in the processor 1210 or instructions in a form of software. That is, the steps of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the processor 1220. The processor 1210 reads information in the memory 1220, and completes the acts of the above method in combination with its hardware. In order to avoid repetition, detailed description is not provided herein.

An embodiment of the present disclosure also provides a computer-readable storage medium on which a computer program is stored, and when the program is executed by the processor, the unreal engine graphic construction method according to any embodiment of the present disclosure is realized. A method driving an unreal engine for a graphic construction by executing executable instructions is basically the same as the unreal engine graphic construction method provided by the above-mentioned embodiments of the present disclosure, and will not be repeated here.

In some possible implementation modes, various aspects of the unreal engine graphic construction method provided in the present application may also be implemented in a form of a program product, which includes a program code. When the program product is run on a computer device, the program code is used for enabling the computer device to execute acts in the unreal engine graphic construction method according to various exemplary implementation modes of the present application described above in this specification, for example, the computer device may execute the unreal engine graphic construction method described in the embodiments of the present application.

For the program product, any combination of one or more readable media may be adopted. A readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of the readable storage medium include electrical connections with one or more wires, portable computer disks, hard disks, random access memories (RAM), read-only memories (ROM), erasable programmable read-only memories (EPROM or flash memories), optical fibers, portable compact disk read-only memories (CD-ROM), optical storage devices, magnetic storage devices, or any suitable combination of the above.

Those of ordinary skills in the art may understand that all or some of acts in the methods disclosed above, functional modules or units in systems and apparatuses may be implemented as software, firmware, hardware, and an appropriate combination thereof. In a hardware implementation mode, division between functional modules/units mentioned in the above description does not necessarily correspond to division of physical components. For example, a physical component may have multiple functions, or a function or an act may be performed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer-readable instruction, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be used for storing desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementations without departing from the spirit and scope of the present disclosure. However, the patent protection scope of the present invention should be subject to the scope defined by the appended claims.

The invention claimed is:

1. An unreal engine graphic construction method, comprising:
   receiving data to be displayed;
   determining a number N of basic graphics contained in a graphic to be constructed according to the data to be displayed, where N>1; and
   calling an underlying function at a blueprint layer and drawing N of the basic graphics in sequence, wherein the underlying function is used for creating the basic graphics;
   wherein the data to be displayed comprises N non-zero target values, the graphic is a columnar thermodynamic diagram, the basic graphics are rectangular bodies, and the drawing N of the basic figures in sequence comprises:
   determining a number M of two-dimensional bases contained in the graphic to be constructed according to a dimension N1 of a first data and a dimension N2 of a second data in the data to be displayed, wherein M=N1*N2;

determining a maximum target value and a minimum target value in the data to be displayed, and determining a coloring disk according to the determined maximum target value and the minimum target value, wherein the coloring disk comprises a plurality of colors and a target data range corresponding to each color; and generating N rectangular bodies on a two-dimensional base corresponding to the N non-zero values, wherein a height of each rectangular body is determined according to a size of the corresponding target value, and the color of each rectangular body is determined according to the color corresponding to the size of the corresponding target value in the coloring disk.

2. The method according to claim 1, wherein each rectangular body comprises eight points, and the eight points comprises a zero point, a first point, a second point, a third point, a fourth point, a fifth point, a sixth point, and a seventh point;

the Z-axis coordinates of the zero point, the first point, the second point and the third point are the same, the X-axis coordinates of the zero point, the third point, the fourth point and the seventh point are the same, and the Y-axis coordinates of the second point, the third point, the sixth point and the seventh point are the same; and generating one of the rectangular bodies comprises:
calculating coordinates of eight points of the rectangular body; and
generating six faces of the rectangular body, wherein each face of the rectangular body is composed of two triangles, and each triangle is composed of three points of the eight points.

3. The method according to claim 2, wherein a material of the rectangular body is exposed to the blueprint layer, and the material of the rectangular body is a transparent material or an opaque material.

4. The method according to claim 1, wherein the data to be displayed comprises data of N dimensions, the graphic is a Nightingale rose diagram, the basic graphics is a fan, and the drawing N of the basic graphics in sequence comprises:
determining coordinates of a center position;
determining an angle $\partial$ of each fan, where $\partial=360/N$; and
drawing N fans in sequence, wherein a start angle of an i-th fan is $(i-1)*\partial$, an end angle of the i-th fan is $i*\partial$, an outer diameter of the i-th fan is determined according to a size of a target data value in data of a i-th dimension, $1 \le i \le N$.

5. The method according to claim 4, wherein
each of the fans comprises three points: a center of a circle, a start point, and an end point;
in each fan, an angle between a line from the center of the circle to the start point and a line from the center of the circle to the end point is equal to $\partial$ angle, a length of the line from the center of the circle to the start point is equal to a length of the line from the center of the circle to the end point.

6. The method according to claim 4, wherein a material and color of the fan are exposed to the blueprint layer, and the material of the fan is a transparent material or an opaque material.

7. The method according to claim 1, wherein the data to be displayed comprises data of N dimensions, data of each dimension comprises a plurality of discrete connection points, the graphic is a parallel coordinate system curve graph with concurrent multi-dimensions, the basic graphics is a Bezier curve, and drawing an i-th basic graphic comprises:
acquiring all discrete connection points in data of i-th dimension;
generating two control points between every two adjacent discrete connection points, wherein the two control points causes a sub-Bezier curve to be generated between the two adjacent discrete connection points, and a connection point between the two adjacent sub-Bezier curves and the control points on both sides of the connection point are collinear; and
generating a Bezier curve connecting all discrete connection points in the data of i-th dimension according to the generated control points, wherein a connection line of the connection point and adjacent control points is tangent to the Bezier curve, $1 \le i \le N$.

8. The method according to claim 7, wherein a material and color of the Bezier curve are exposed to the blueprint layer, and the material of the Bezier curve is a transparent material or an opaque material.

9. An unreal engine graphic construction apparatus, comprising a memory and a processor connected to the memory, wherein the memory is configured to store instructions, the processor is configured to perform steps of the unreal engine graphic construction method according to claim 1 based on the instructions stored in the memory.

10. A non-transitory computer-readable storage medium, having a computer program stored thereon, wherein the program implements the unreal engine graphic construction method of claim 1 when executed by a processor.

* * * * *